(12) United States Patent
Sharma et al.

(10) Patent No.: US 7,433,986 B2
(45) Date of Patent: Oct. 7, 2008

(54) MINIMIZING ISR LATENCY AND OVERHEAD

(75) Inventors: Sanjay Kumar Sharma, Wayne, NJ (US); Pawan Kumar Dhanrajani, Monsey, NY (US); Michael Philip Bottiglieri, Rivervale, NJ (US); Jaya Sarup, Monroe, NY (US); Zafrir Babin, Glen Rock, NJ (US); Dorin Dogaroiu, Woodside, NY (US)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 11/271,772

(22) Filed: Nov. 14, 2005

(65) Prior Publication Data

US 2007/0112987 A1    May 17, 2007

(51) Int. Cl.
  *G06F 13/24* (2006.01)
(52) U.S. Cl. ................................ 710/261; 712/228
(58) Field of Classification Search ......... 712/228–229, 712/233; 710/260–261
  See application file for complete search history.

(56) References Cited

U.S. PATENT DOCUMENTS

| | | | | |
|---|---|---|---|---|
| 4,512,017 A | * | 4/1985 | Nici et al. .................... 370/524 |
| 5,640,548 A | * | 6/1997 | Langan et al. ................ 712/220 |
| 5,847,705 A | * | 12/1998 | Pope ........................... 715/790 |
| 5,862,389 A | * | 1/1999 | Kardach et al. ............. 710/266 |
| 6,574,770 B1 | * | 6/2003 | Daudelin ..................... 714/776 |
| 7,054,972 B2 | * | 5/2006 | Parry et al. .................. 710/260 |
| 7,082,518 B2 | * | 7/2006 | Leijten et al. ............... 712/228 |
| 2006/0224808 A1 | * | 10/2006 | Depew et al. ............... 710/267 |

OTHER PUBLICATIONS

Davik, Fredrik et al., IEEE 802.17 Resilient Packet Ring Tutorial, Nov. 7, 2003, 7 pp. (http://www.ifi.uio.no/forskning/grupper/nd/opnet/rpr_tutorial_submission.pdf, accessed Mar. 29, 2007).*

* cited by examiner

*Primary Examiner*—Clifford H Knoll
(74) *Attorney, Agent, or Firm*—Hanify & King, P.C.

(57) ABSTRACT

The capability to handle the 100 μs RPR interrupt and similar interrupts is provided by servicing selected interrupts outside of the operating system. This drastically reduces the latency and overhead associated with servicing the interrupt. A method of handling an interrupt in a computer system comprises receiving the interrupt at the computer system, determining whether the interrupt is a selected interrupt, and performing interrupt processing not involving an operating system of the computer system, if the interrupt is a selected interrupt.

15 Claims, 5 Drawing Sheets

MINIMIZING ISR LATENCY AND OVERHEAD

BACKGROUND OF THE INVENTION

1. Field of the Invention

The present invention relates to handling the 100 µs RPR interrupt and similar interrupts by servicing selected interrupts outside of the operating system.

2. Description of the Related Art

Resilient Packet Ring (RPR), specified in IEEE standard 802.17, is a standard designed for the optimized transport of data traffic over shared packet rings. It is designed to provide the resilience found in SONET/SDH networks (50 ms protection), but instead of setting up circuit oriented connections, it provides a packet-based transmission. This is to increase the bandwidth efficiency of packet-based services.

RPR works on a concept of dual counter rotating rings called ringlets. These ringlets are setup by creating RPR stations at nodes where traffic is supposed to drop, per flow (a flow is the ingress and egress of data traffic). Each ring segment used to transport data between stations is referred to as a span. RPR uses MAC (Media Access Control protocol) messages to direct the traffic, which traverses both directions around the ringlet. The nodes also negotiate for bandwidth among themselves using fairness algorithms, avoiding congestion and failed spans. The avoidance of failed spans is accomplished by using one of two techniques known as "steering" and "wrapping". Under steering if a node or span is broken all nodes are notified of a topology change and they reroute their traffic. In wrapping the traffic is looped back at the last node prior to the break and routed to the destination station.

All traffic on the ring is assigned a Class of Service (CoS) and the standard specifies three classes. Class A (or High Priority) traffic is a pure CIR (Committed Information Rate) and is designed to support applications requiring low latency and jitter, such as voice and video. Class B (or Medium Priority) traffic is a mix of both a CIR and an EIR (Excess Information Rate—which is subject to fairness queuing). Class C (or Low Priority) is best effort traffic, utilizing whatever bandwidth is available. This is primarily used to support internet access traffic.

RPR protocol requires Class C Traffic Fairness State Machines to be run as often as every 100 microseconds (µs). To achieve this in software, the CPU must be interrupted every 100 µs. Processing interrupts at such high rates is difficult in software. The operating system overhead and latency to call the Interrupt Service Routine (ISR) makes it difficult to service interrupts reliably at such frequent intervals. A need arises for a technique that overcomes this limitation to reliably process the 100 µs interrupt and similar interrupts.

SUMMARY OF THE INVENTION

The present invention provides the capability to handle the 100 µs RPR interrupt and similar interrupts by servicing selected interrupts outside of the operating system. This drastically reduces the latency and overhead associated with servicing the interrupt. Every time the CPU is interrupted, it jumps to an interrupt vector, which calls the operating system Interrupt Service Routine Wrapper to determine the source of the interrupt. The Wrapper saves the context of the processor and then calls the operating system interrupt handling routine. This invention bypasses the operating system interrupt handling routine to eliminate the operating system overheads. It checks if one of the selected interrupts is pending. If so, it calls the associated ISR directly without entering the operating system. If not, it enters the operating system ISR to service other types of interrupts. This makes it possible to service the selected interrupts with minimal overhead, while still preserving the servicing of other types of interrupts without any modification.

In one embodiment of the present invention, a method of handling an interrupt in a computer system comprises receiving the interrupt at the computer system, determining whether the interrupt is a selected interrupt, and performing interrupt processing not involving an operating system of the computer system, if the interrupt is a selected interrupt. The selected interrupt may be a Resilient Packet Ring Protocol Class C Fairness Traffic interrupt. The selected interrupt may be received periodically. The selected interrupt may be received with a periodicity as low as 100 µS. The method may further comprise performing interrupt processing using the operating system of the computer system, if the interrupt is not a selected interrupt.

BRIEF DESCRIPTION OF THE DRAWINGS

The preferred embodiments of the present invention will be described with reference to the accompanying drawings.

DETAILED DESCRIPTION OF THE PREFERRED EMBODIMENTS

The present invention processes selected interrupts, such as those that occur at a high frequency (every 100 µS), outside the Operating System. By handling the interrupt outside the OS, the overheads and latency introduced by the OS Interrupt Handler may be avoided. When the CPU is interrupted, it first jumps to the interrupt vector. Here it is determined whether the 100 µS interrupt (or other selected interrupt) is pending. If so, the interrupt is handled outside the OS. If not, the OS Interrupt Handler is used to handle other interrupts as usual.

Figure 1:
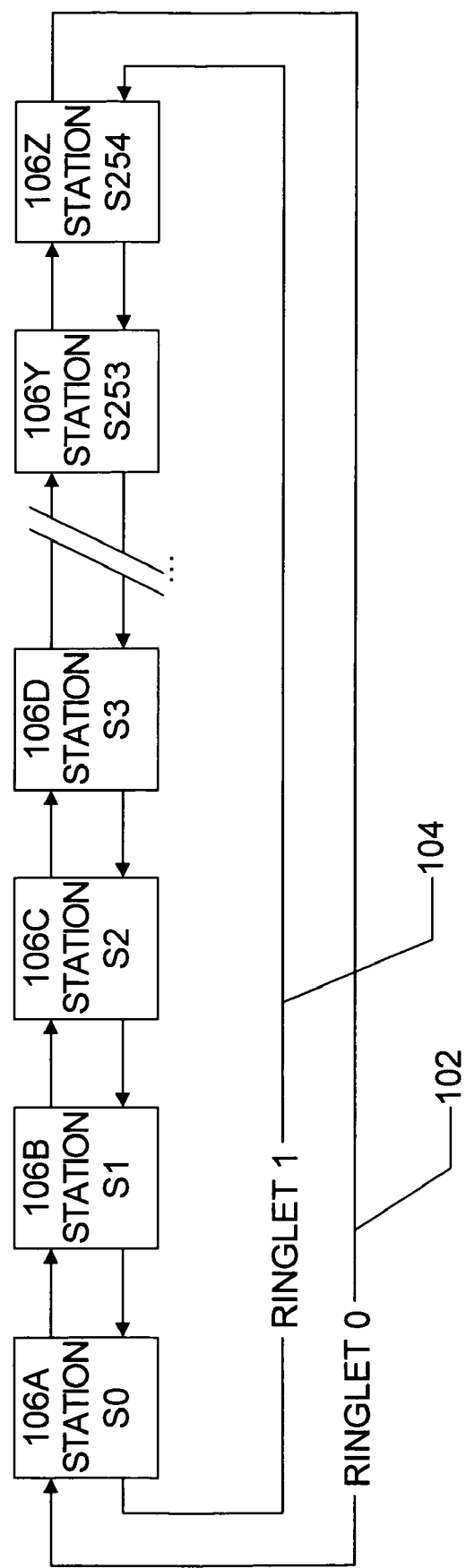
FIG. 1 is an exemplary block diagram of an RPR ring structure.

An example of an RPR ring structure 100 is shown in FIG. 1. RPR employs a ring structure using unidirectional, counter-rotating ringlets. Each ringlet is made up of links with data flow in the same direction. The ringlets are identified as ringlet0 102 and ringlet1 104, as shown in FIG. 1. The association of a link with a specific ringlet is not altered by changes in the state of the links or stations. Stations on the ring, such as stations 106A-N, are identified by an IEEE 802 48-bit MAC address as specified in IEEE Std. 802-2002. All links on the ring operate at the same data rate, but they may exhibit different delay properties. The portion of a ring bounded by adjacent stations is called a span. A span is composed of unidirectional links transmitting in opposite directions. Station Y is said to be a downstream neighbor of station X on ringlet0 102/1 if the station X traffic becomes the receive traffic of station Y on the referenced ringlet. Thus, station S5 is the downstream neighbor of station S4 on ringlet0 102; similarly station S2 is the downstream neighbor of station S3 on ringlet1 104. Station Y is said to be an upstream neighbor of station X on ringlet0/1 102,104 if the station Y traffic becomes the receive traffic of station X on the referenced ringlet. Thus, station S4 is the upstream neighbor of station S5 on ringlet0 102; similarly station S3 is the upstream neighbor of station S2 on ringlet1 104.

Figure 2:
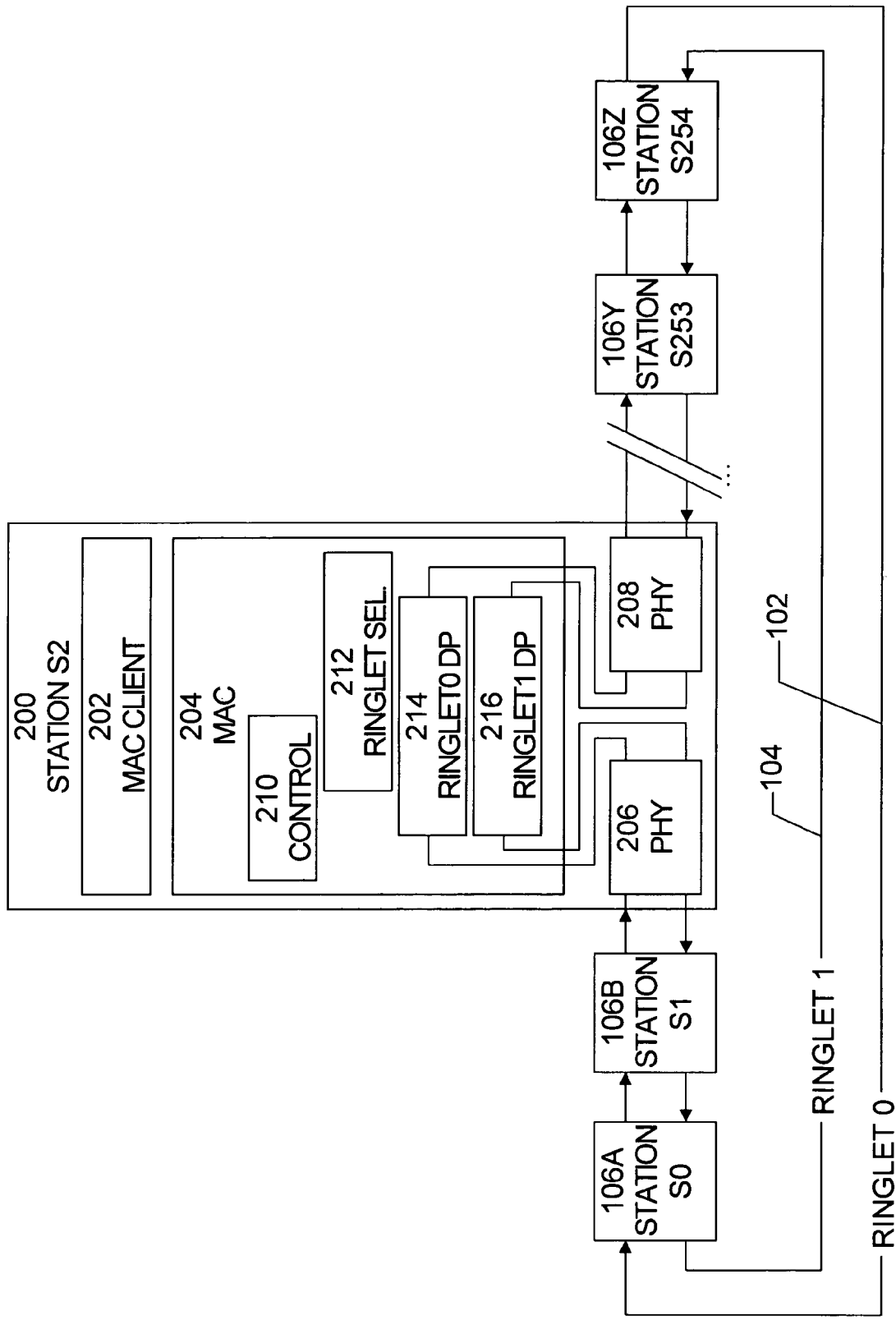
FIG. 2 is an exemplary block diagram of a station in the RPR ring structure shown in FIG. 1.

An example of a station 200 in an RPR ring structure 100 is shown in FIG. 2. Station 200 includes one client entity 202, one MAC entity 204, and two PHY entities 206, 208. Each PHY 206, 208 is associated with a span shared with a neighboring station. The MAC entity 204 contains one MAC control entity 210, a ringlet selection entity 212, and two datapath entities 214, 216 (one datapath is associated with each ringlet). The PHY 208 transmitting on ringlet0 102 and receiving on ringlet1 104 is identified as the east PHY 208. The PHY 206 transmitting on ringlet1 104 and receiving on ringlet0 102 is identified as the west PHY 206. The ringlet0 102 datapath receives frames from the west PHY 206 and transmits or retransmits frames on the east PHY 208. The ringlet1 104 datapath receives frames from the east PHY 208 and transmits or retransmits frames on the west PHY 206.

Operating System (OS) overheads make it extremely difficult to process interrupts generated at a very fast rate (with period in microseconds). For example, the RPR Protocol requires Class C Fairness Traffic State Machines to run as often as every 100 microseconds (µS). To avoid hardware complications, this must be done in software, with the CPU being interrupted every 100 µS by the hardware to run Fairness State Machine. If the services provided by the OS are used to process this interrupt, the overheads consume a majority of the 100 µS time. This causes interrupts to be missed, delay (latency) in Interrupt processing, and CPU time lost in interrupt overheads.

Figure 3:
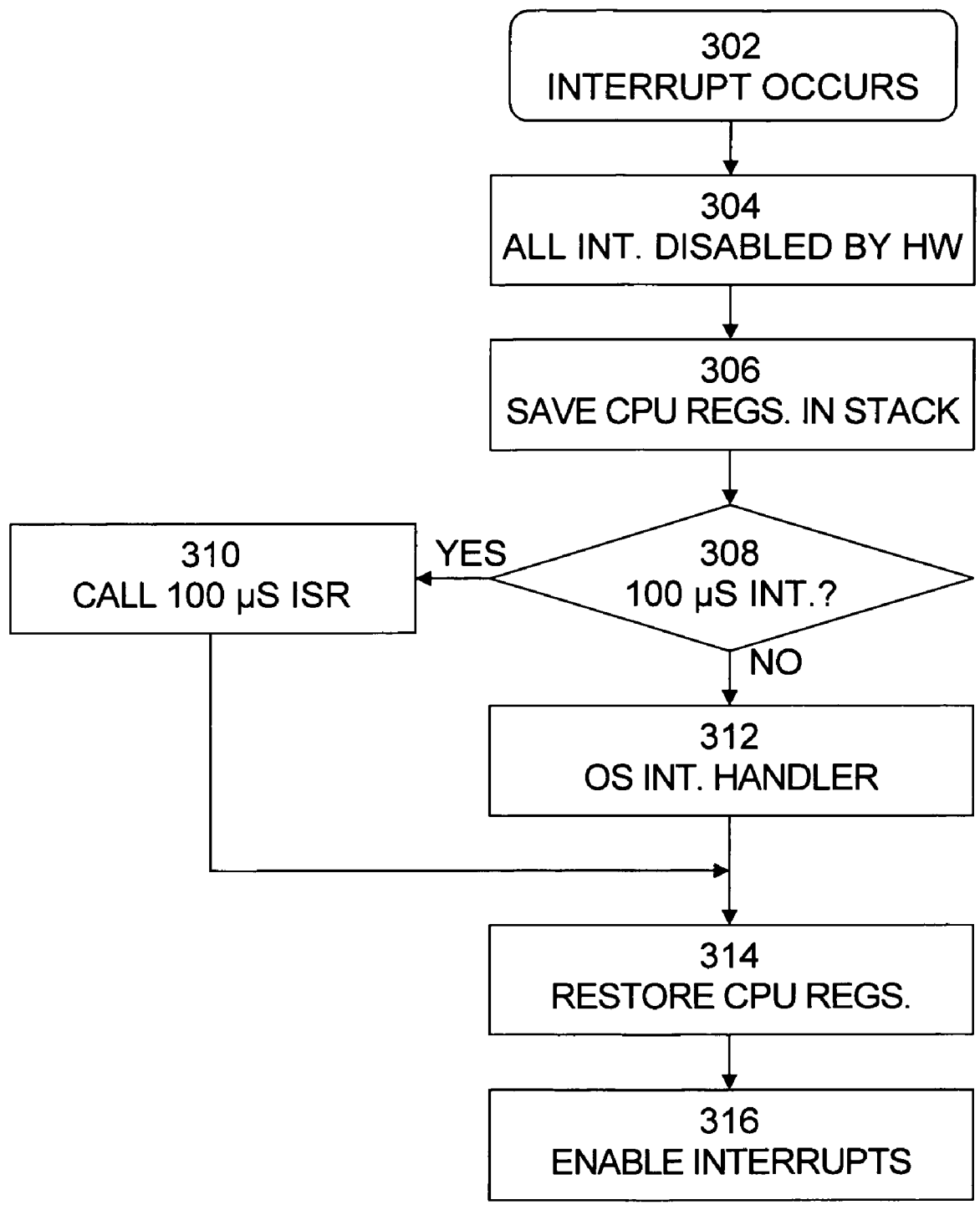
FIG. 3 is an exemplary flow diagram of a process of interrupt handling, according to the present invention.

The present invention overcomes this problem by processing the interrupt which occurs at a high frequency (such as every 100 µS) outside the Operating System. By handling the interrupt outside the OS, all the overheads and latency introduced by the OS Interrupt Handler may be avoided. An example of an interrupt handling process 300 is shown in FIG. 3. Process 300 begins with step 302, in which an interrupt occurs. Typically, this interrupt is hardware generated and indicated by an interrupt signal. For example, the 100 µS RPR interrupt is typically generated by a hardware timer. The CPU hardware receives the interrupt signal and performs some responses in hardware and some responses in software. In step 304, circuitry in the CPU responds to receipt of the interrupt signal by disabling response of the circuitry to any other interrupts. Interrupt signals may still be received and stored, but response to such signals is disabled.

In step 306, the CPU hardware causes the CPU state, such as the contents of the CPU registers, to be saved during the handling of the interrupt. Typically, the CPU registers are stored on the CPU stack, although other storage locations may be used. In step 308, the received interrupt is examined to determine whether it is the 100 µS interrupt (or other selected interrupt). If the interrupt is the 100 µS interrupt (or other selected interrupt), then the process continues with step 310, in which the 100 µS interrupt (or other selected interrupt) service routine is executed. The 100 µS interrupt (or other selected interrupt) service routine includes programming code that is not part of the operating system, and which executes separately from the operating system. In particular, the 100 µS interrupt (or other selected interrupt) service routine cannot use any operating system resources in order to perform its service of the 100 µS interrupt (or other selected interrupt). This allows the 100 µS interrupt (or other selected interrupt) service routine to be designed to reliably handle the 100 µS interrupt (or other selected interrupt) within the required response time.

If, in step 308, it is determined that the received interrupt is not the 100 µS interrupt (or other selected interrupt), then the process continues with step 312, in which the operating system interrupt handler responds to the interrupt, as is well known.

After the completion of step 310 or 312, whichever is applicable, the process continues with step 314, in which the CPU registers are restored. Typically, this is done by popping the CPU register entries from the stack, or by reading the CPU register entries from whatever memory in which they are stored. Restoring the CPU registers restores the CPU to the operating condition that it was in before the interrupt was received. In step 316, the interrupt circuitry is enabled to respond once again to interrupts, such as any pending interrupts and/or any interrupts that may be received in the future.

Figure 4:
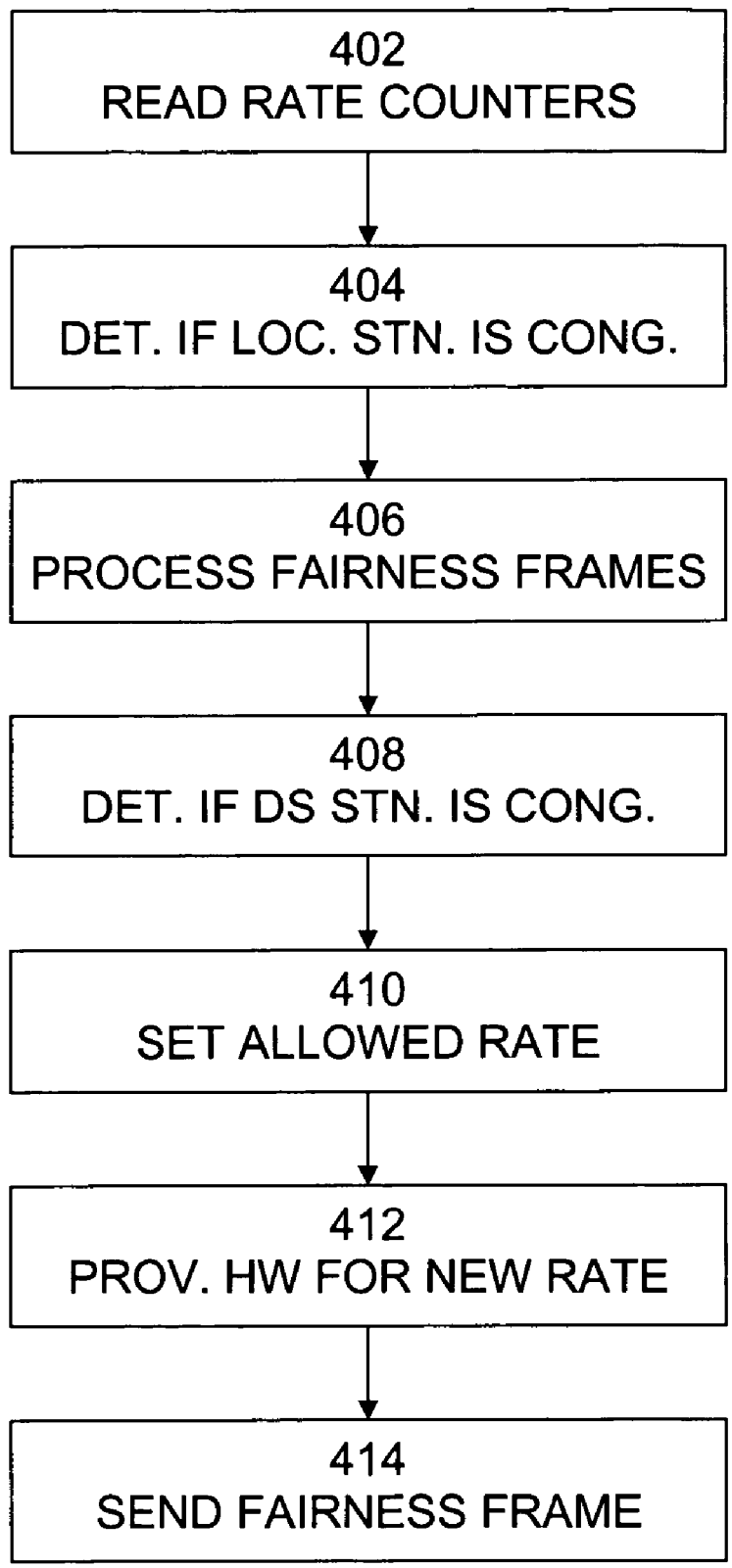
FIG. 4 is an exemplary flow diagram of an interrupt service routine shown in FIG. 3.

An example of an interrupt service routine 400 that handles the 100 µS interrupt in the RPR system is shown in FIG. 4. This is only an example, other processes may be used to handle the 100 µS interrupt in the RPR system. Further, as the present invention is applicable to other selected interrupts as well, the interrupt service routine may perform other functions than those defined by the RPR system. The present invention contemplates any and all selected interrupts and interrupts service routines.

In the example shown in FIG. 4, the RPR protocol guarantees that various RPR stations on an RPR ring are provided fair ring access for the Fairness Eligible (Class C/Best Effort) traffic. To accomplish this, RPR standard defines a Fairness Clause, and various Fairness State machines associated with the clause. Fairness state machines run periodically on every RPR station for rate adjusting the insertion of Fairness Eligible traffic on the ring. For rings with bandwidth greater than 622 Mbps (>=STS-12), the fairness related state machines need to be run once every 100 us. As a result, the shown interrupt service routine 400 runs every 100 µS to run the Fairness related state machines. Routine 400 begins with step 402, in which the Rate Counters are read from the hardware. This is done to determine how much traffic the local station is adding to the ring and how much traffic is transiting through the station. It is also used to determine if a delay threshold has been exceeded for packets in the buffer that are waiting to be transmitted.

In step 404, it is determined whether the local station is congested. The information from the rate counters read in the first step is used to calculate if the local station is currently experiencing congestion. In step 406, the Fairness frames received from neighboring stations are processed. Neighboring stations periodically (every 400 µS) send fairness protocol frames to indicate their local fair traffic rate. In step 408, it is determined whether the downstream station is congested and, if so, the number of hops to the congestion is determined. Information from the received fairness frames is used to find out if the neighboring stations are experiencing congestion and to determine the size of the congestion domain. This determines how many hops the packets travel until they reach the head of the congestion domain.

In step 410, the Rate Adjustment State Machine is called in order to set the allowed rate. Using the information obtained in steps 402-408, the rate adjustment state machine is called to calculate the allowed rate in the congested state. This determines how much Class C traffic the local station can add. In step 412, the hardware is provisioned for the new allowed rate. The new congestion state allowed rate is programmed in the hardware to police the amount of Class C traffic that is being added to the ring. In step 414, the Fairness frame is sent to the neighboring stations. The local station needs to send fairness frames to the neighbor stations every 400 μS. These frames convey the fair rate information as seen by the local station.

Figure 5:
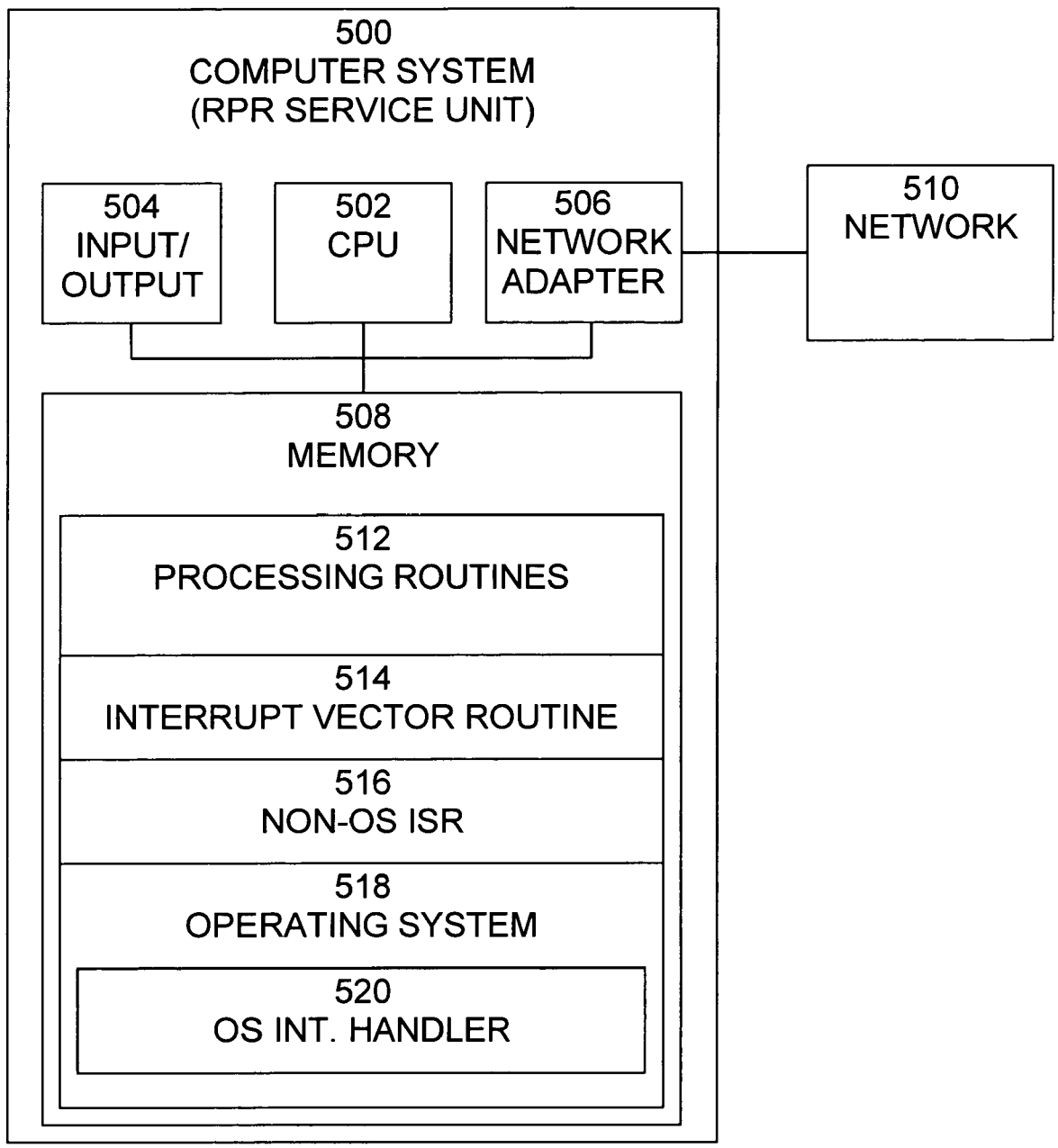
FIG. 5 is a block diagram of a computer system, such as may be found in an RPR service unit, in which the present invention may be implemented.

A block diagram of an exemplary computer system 500, such as may be found in an RPR service unit, in which the present invention may be implemented, is shown in FIG. 5. Computer system 500 is typically a programmed general-purpose computer system, such as a personal computer, workstation, server system, and minicomputer or mainframe computer. Computer system 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Although in the example shown in FIG. 5, computer system 500 is a single processor computer system, the present invention contemplates implementation on a system or systems that provide multi-processor, multi-tasking, multi-process, multi-thread computing, distributed computing, and/or networked computing, as well as implementation on systems that provide only single processor, single thread computing. Likewise, the present invention also contemplates embodiments that utilize a distributed implementation, in which computer system 500 is implemented on a plurality of networked computer systems, which may be single-processor computer systems, multi-processor computer systems, or a mix thereof.

Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces computer system 500 with network 510. In the case where computer system 500 is included in an RPR service unit, network 510 is an RPR network. However, network 510 may be any standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes processing routines 512, interrupt vector routine 514, on-operating system interrupt service routine 516, operating system 518, and operating system interrupt handler 520. Interrupt vector routine examines received interrupts and determines whether they are the 100 μS interrupt (or other selected interrupt). Non-operating system interrupt service routine 516 is code that provides the response to the 100 μS interrupt (or other selected interrupt). Operating system 518 provides overall system functionality, including operating system interrupt handler 520. Operating system interrupt handler 520 provides the response to interrupts other than the 100 μS interrupt (or other selected interrupt). Processing routines 512 provide other system functionality.

Although specific embodiments of the present invention have been described, it will be understood by those of skill in the art that there are other embodiments that are equivalent to the described embodiments. For example, in some electronic equipment it may be advantageous to reducing EMI emissions to provide more than two phases of clock, such as four or more phases, or even a different phase for each active clock signal. In some equipment, the provision of multiple phases of signals may be advantageously applied to signals other than clock signals. Likewise, in some equipment, it may be advantageous to route out-of-phase signal conductors next to or adjacent to each other. In addition, the technique may be applied to a wide variety of electronic equipment, such as single boards, a shelf with multiple plug-ins, multiple connected shelves, etc.

Accordingly, it is to be understood that the invention is not to be limited by the specific illustrated embodiments, but only by the scope of the appended claims.

What is claimed is:

1. A method of handling an interrupt in a computer system, comprising:

receiving the interrupt at the computer system;

saving a state of the processor in response to receipt of the interrupt at the computer system, wherein similar state information is saved for all interrupts;

determining whether the interrupt is a selected interrupt; and performing an interrupt service routine not involving an operating system of the computer system, if the interrupt is a selected interrupt, wherein the interrupt service routine determines an amount of data traffic.

2. The method of claim 1, wherein the selected interrupt is a Resilient Packet Ring Protocol Class C Fairness Traffic interrupt.

3. The method of claim 2, wherein the selected interrupt is received periodically.

4. The method of claim 3, wherein the selected interrupt is received with a period of 100 μS.

5. The method of claim 1, further comprising:

performing interrupt processing using the operating system of the computer system, if the interrupt is not a selected interrupt.

6. A computer system comprising:

a processor operable to execute computer program instructions;

circuitry operable to receive an interrupt signal;

a memory operable to store computer program instructions executable by the processor; and computer program instructions stored in the memory and executable to perform the steps of:

saving a state of the processor in response to receipt of an interrupt signal at the computer system, wherein similar state information is saved for all interrupt signals;

determining whether the interrupt signal received at the computer system corresponds to a selected interrupt;

performing an interrupt service routine not involving an operating system of the computer system, if the interrupt is a selected interrupt, wherein the interrupt service routine determines an amount of data traffic.

7. The system of claim 6, wherein the selected interrupt is a Resilient Packet Ring Protocol Class C Fairness Traffic interrupt.

8. The system of claim 7, wherein the selected interrupt is received periodically.

9. The system of claim 8, wherein the selected interrupt is received with a period of 100 µS.

10. The system of claim 6, further comprising:

performing interrupt processing using the operating system of the computer system, if the interrupt is not a selected interrupt.

11. A computer program product for handling an interrupt in a computer system, comprising:

a computer readable medium;

computer program instructions, recorded on the computer readable medium, executable by a processor, for performing the steps of saving a state of the processor in response to receipt of an interrupt signal at the computer system, wherein similar state information is saved for all interrupt signals;

determining whether the interrupt received at the computer system is a selected interrupt;

performing an interrupt service routine not involving an operating system of the computer system, if the interrupt is a selected interrupt, wherein the interrupt service routine determines an amount of data traffic.

12. The computer program product of claim 11, wherein the selected interrupt is a Resilient Packet Ring Protocol Class C Fairness Traffic interrupt.

13. The computer program product of claim 12, wherein the selected interrupt is received periodically.

14. The computer program product of claim 13, wherein the selected interrupt is received with a period of 100 µS.

15. The computer program product of claim 11, further comprising:

performing interrupt processing using the operating system of the computer system, if the interrupt is not a selected interrupt.

* * * * *